United States Patent
Chamberlain

(10) Patent No.: US 7,438,262 B2
(45) Date of Patent: Oct. 21, 2008

(54) REDUNDANT GAS TURBINE ENGINE MOUNTING ARRANGEMENT

(75) Inventor: Mark Chamberlain, Derby (GB)

(73) Assignee: Rolls-Royce plc., London (GB)

( * ) Notice: Subject to any disclaimer, the term of this patent is extended or adjusted under 35 U.S.C. 154(b) by 185 days.

(21) Appl. No.: 11/375,092

(22) Filed: Mar. 15, 2006

(65) Prior Publication Data

US 2006/0231679 A1    Oct. 19, 2006

(30) Foreign Application Priority Data

Apr. 16, 2005 (GB) .................................. 0507721.9

(51) Int. Cl.
*B64D 27/10* (2006.01)
*B64D 27/12* (2006.01)

(52) U.S. Cl. .............................. 244/54; 248/554; 60/796

(58) Field of Classification Search .................. 244/54; 248/554–557, 317; 60/796, 797
See application file for complete search history.

(56) References Cited

U.S. PATENT DOCUMENTS

| | | | | |
|---|---|---|---|---|
| 3,006,587 A * | 10/1961 | Morel et al. | ................. | 248/554 |
| 3,985,322 A * | 10/1976 | Mabuchi et al. | ............. | 248/554 |
| 5,108,045 A * | 4/1992 | Law et al. | ....................... | 244/54 |
| 5,474,258 A * | 12/1995 | Taylor et al. | ................... | 244/54 |
| 5,871,175 A * | 2/1999 | Demouzon et al. | ............. | 244/54 |
| 5,871,176 A * | 2/1999 | Demouzon et al. | ............. | 244/54 |
| 5,871,177 A * | 2/1999 | Demouzon et al. | ............. | 244/54 |
| 6,059,227 A * | 5/2000 | Le Blaye et al. | ............... | 244/54 |
| 6,347,765 B1 * | 2/2002 | Jule et al. | ....................... | 244/54 |
| 6,474,597 B1 * | 11/2002 | Cazenave | ..................... | 244/54 |
| 2002/0104924 A1 * | 8/2002 | Roszak | .......................... | 244/54 |
| 2005/0082423 A1 * | 4/2005 | Whitmer et al. | ............... | 244/54 |

FOREIGN PATENT DOCUMENTS

| | | |
|---|---|---|
| EP | 0 744 338 A1 | 11/1996 |
| EP | 0 872 418 A3 | 10/1998 |
| EP | 1 103 463 A | 5/2001 |

* cited by examiner

*Primary Examiner*—Michael R. Mansen
*Assistant Examiner*—Joshua J Michener
(74) *Attorney, Agent, or Firm*—Oliff & Berridge, PLC

(57) ABSTRACT

A gas turbine engine mounting arrangement for attaching a gas turbine engine to a support structure, such as a pylon of an aircraft, comprises a main mounting member adapted to interconnect the engine with the pylon and transmit loads therebetween under normal engine operating conditions, and an auxiliary mounting member which is capable of interconnecting the engine with the pylon and transmitting loads therebetween in the event of failure of the main mounting member, the auxiliary mounting member being arranged to be substantially unloaded under normal engine operating conditions. The main mounting member includes a first primary load transmission means for transmitting vertical loads between the engine and the pylon and a second primary load transmission means for transmitting thrust and lateral loads between the engine and the pylon. The auxiliary mounting member includes a first secondary load transmission means for transmitting vertical loads between the engine and the pylon and a second secondary load transmission means for transmitting thrust and lateral loads between the engine and the pylon.

25 Claims, 7 Drawing Sheets

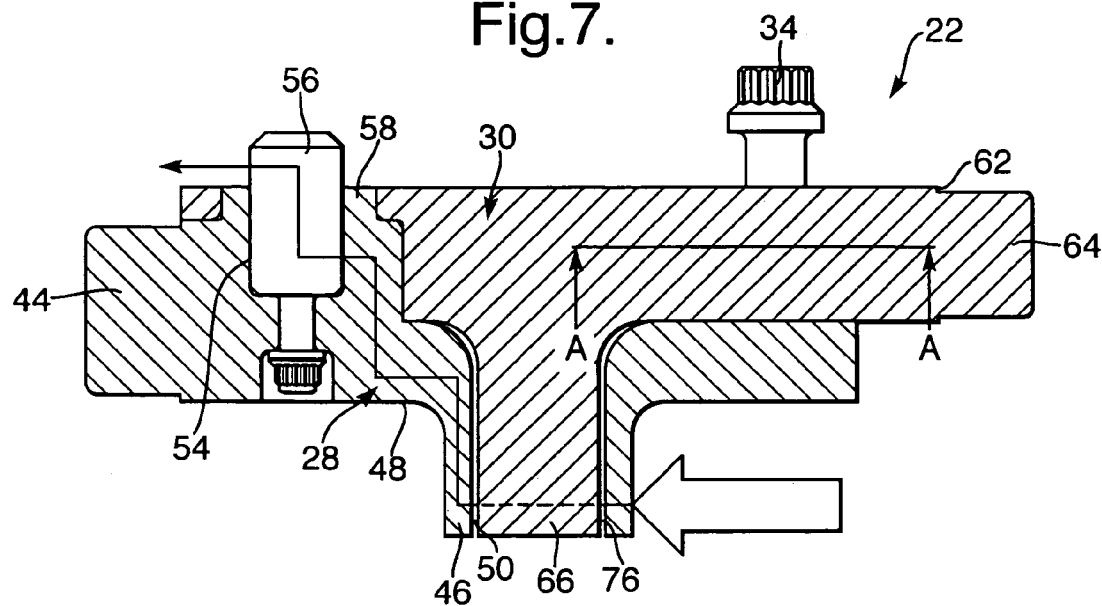
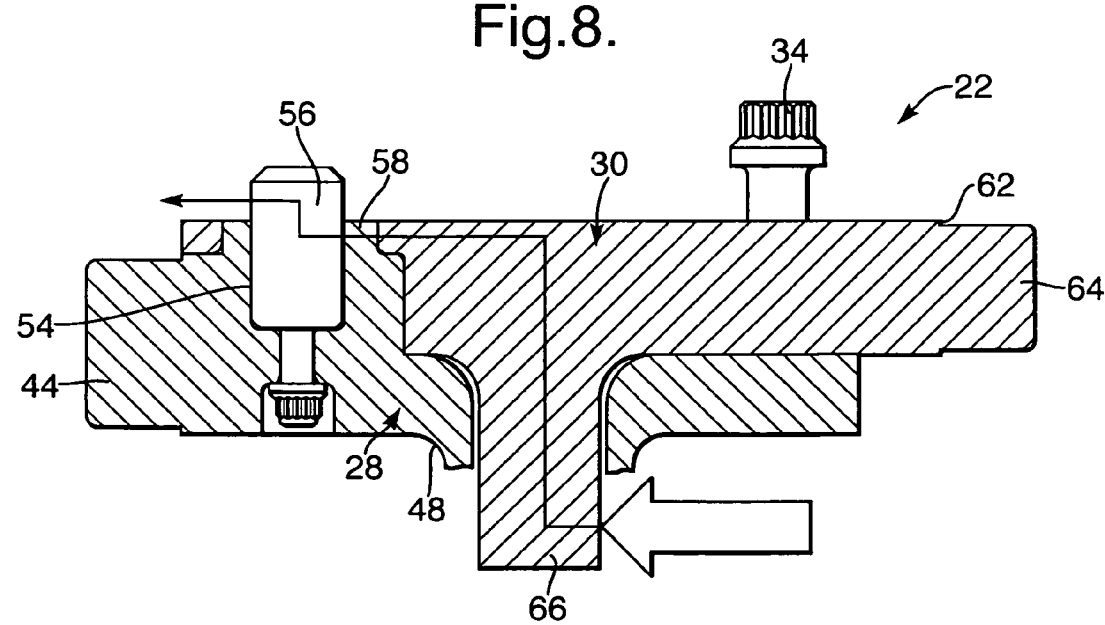

REDUNDANT GAS TURBINE ENGINE MOUNTING ARRANGEMENT

The present invention relates to a gas turbine engine mounting arrangement for attaching a gas turbine engine to a support structure, and particularly but not exclusively to a gas turbine engine mounting arrangement for attaching a gas turbine engine to an aircraft via a pylon.

Ducted fan gas turbine engines for powering aircraft are mounted upon, and suspended from, the aircraft via a pylon. The pylon may extend from the aircraft wing or alternatively from the aircraft fuselage, and a mounting arrangement is used to interconnect the engine to the pylon, and hence to the aircraft.

One conventional type of mounting arrangement is the so-called core mount, where the pylon extends through the engine nacelle, across the by-pass duct towards the core engine casing. The mounting arrangement then interconnects the core engine casing, and so core engine, to the pylon. Generally both a front or forward mounting arrangement in the region of the compressor section of the core engine and a rear mounting arrangement in the region of the turbine section of the engine are used to connect the core engine to the pylon at two axially separated locations. The fan casing may be independently connected to the pylon or, more typically, supported from and by the core engine casing and core engine mountings.

Such conventional mounting arrangements are required to carry and transmit all of the operating loads of the engine, including side, vertical, axial (thrust) and torque loads, to the pylon under normal engine operating conditions. They must also provide primary and secondary load paths such that in the event of failure of any of the primary load paths, the operating loads continue to be transmitted by the secondary load paths.

In order to provide such a mounting arrangement with primary and secondary load paths, the mounting arrangement may be split into two symmetrical left and right halves, which are joined together by a series of bolts. This configuration is commonly known as a split bracket. Each half of the split bracket is designed to be capable of carrying, without structural failure, the normal thrust, side and vertical engine loads arising from operation of the aircraft within its permitted flight envelope, so that these loads can be carried safely by only one half of the split bracket in the event of failure of the other half.

A drawback with the conventional split bracket arrangement is that both halves of the split bracket are subjected to the engine operating loads under normal operation. A high degree of accuracy is therefore required during assembly, either during manufacture or maintenance, to ensure that the two bracket halves are aligned correctly. Failure to do this will lead to unequal load distribution between the two halves, potentially reducing the fatigue life of the more highly loaded half and, consequently, the entire mounting arrangement.

It would therefore be desirable to provide an improved gas turbine engine mounting arrangement which has improved failure tolerance and/or which offers improvements generally.

According to a first aspect of the present invention, there is provided a gas turbine engine mounting arrangement for attaching a gas turbine engine to a support structure, the mounting arrangement comprising:

a main mounting member adapted to interconnect an engine with a support structure and transmit loads between the engine and the support structure under normal engine operating conditions;

an auxiliary mounting member capable of interconnecting the engine with the support structure and transmitting loads therebetween in the event of failure of the main mounting member, the auxiliary mounting member arranged to be substantially unloaded under normal engine operating conditions;

characterised in that the main mounting member includes a first primary load transmission means for transmitting vertical loads between the engine and the support structure and a second primary load transmission means for transmitting thrust and lateral loads between the engine and the support structure, and in that the auxiliary mounting member includes a first secondary load transmission means for transmitting vertical loads between the engine and the support structure and a second secondary load transmission means for transmitting thrust and lateral loads between the engine and the support structure.

One or both of the first primary load transmission means and the second primary load transmission means may be provided wholly on the main mounting member. One or both of the first secondary load transmission means and the second secondary load transmission means may be provided wholly on the auxiliary mounting member.

The main mounting member may include an end face and the first primary load transmission means may extend from the end face. The end face may be disposed generally vertically in use, and the first primary load transmission means may extend from the end face, preferably substantially perpendicular thereto so that it is preferably substantially horizontal in use.

The first primary load transmission means may comprise a first primary load transmission pin which may be engageable in a corresponding socket in a linkage attached to a gas turbine engine. The main mounting member may include a bottom face, and the second primary load transmission means may extend from the bottom face. The bottom face may be disposed generally horizontally in use, and the second primary load transmission means may extend from the bottom face, preferably substantially perpendicular thereto so that it is preferably substantially vertical in use.

The second primary load transmission means may comprise a second primary load transmission pin which may be engageable in a corresponding socket in a gas turbine engine. The second primary load transmission pin may define a central longitudinally extending passage.

The main mounting member may include a top face and the passage may extend into, and may also extend through, the main mounting member to preferably define an aperture in the top face.

The auxiliary mounting member may include an end face and the first secondary load transmission means may extend from the end face. The first secondary load transmission means may extend from the end face substantially perpendicular thereto so that it is preferably substantially horizontal in use.

The first secondary load transmission means may comprise a first secondary load transmission pin which may be engageable in a clearance socket in a gas turbine engine. The auxiliary mounting member may include a bottom face, and the second secondary load transmission means may extend from the bottom face. The bottom face may be disposed generally horizontally in use, and the second secondary load transmission means may extend from the bottom face preferably substantially perpendicular thereto so that it is preferably substantially vertical in use.

The second secondary load transmission means may comprise a second secondary load transmission pin. The main mounting member and the auxiliary mounting member may be configured such that when mounted together, the second secondary load transmission pin preferably extends into the central longitudinally extending passage of the second primary load transmission pin.

The main mounting member may define a passage for receiving a removable load transmission means, the passage preferably extending between top and bottom faces of the main mounting member and preferably defining an annular abutment on the top face. The auxiliary mounting member may define an aperture which may be locatable around the annular abutment when the main and auxiliary mounting members are mounted together.

The auxiliary mounting member may be interposed between the main mounting member and the support structure, in use.

The main mounting member or the auxiliary mounting member may include locating projections for aligning the main and auxiliary mounting members relative to each other.

The mounting arrangement is preferably adapted to attach a gas turbine engine to an aircraft via a pylon. The mounting arrangement may be adapted to attach a generally forward portion of a gas turbine engine to a pylon. The mounting arrangement may be adapted to connect and attach to a core engine of a ducted fan gas turbine engine or alternatively to a fan casing of a gas turbine engine.

The main mounting member may comprise a material having first material properties, and the auxiliary mounting member may comprise a material having second, different, material properties.

According to a second aspect of the present invention, there is provided a gas turbine engine comprising a mounting arrangement according to the first aspect of the present invention for attaching the gas turbine engine to a support structure.

An embodiment of the present invention will now be described by way of example only and with reference to the accompanying drawings, in which:

FIG. 7 is a diagrammatic cross-sectional side view of the gas turbine engine mounting arrangement in the assembled condition;

FIG. 8 is a view similar to FIG. 7 but illustrating the gas turbine engine mounting arrangement in a damaged condition.

Figure 1:
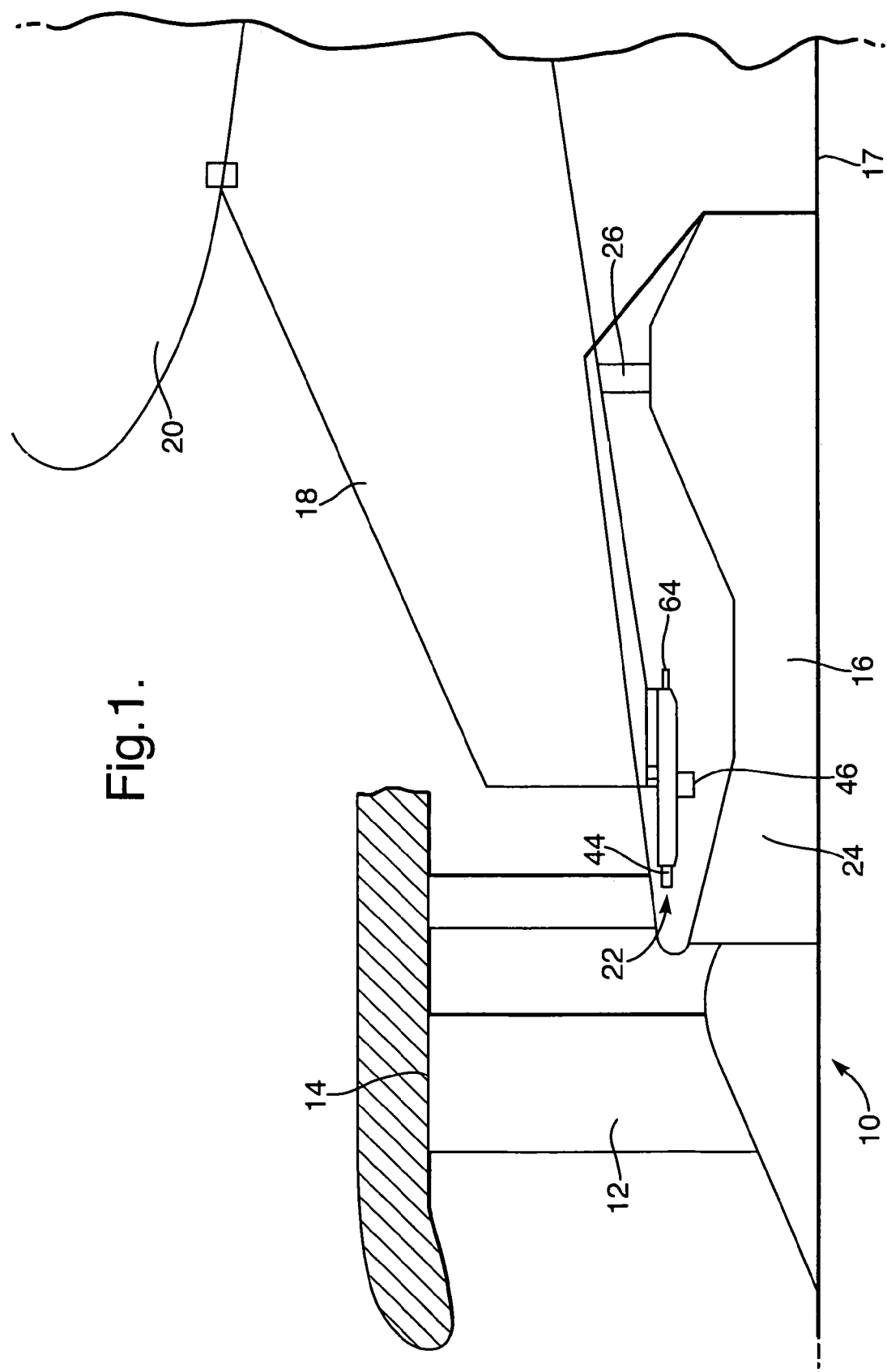
FIG. 1 is a diagrammatic cross-sectional view of part of a ducted fan gas turbine engine including a gas turbine engine mounting arrangement according to the present invention.
Figure 2:
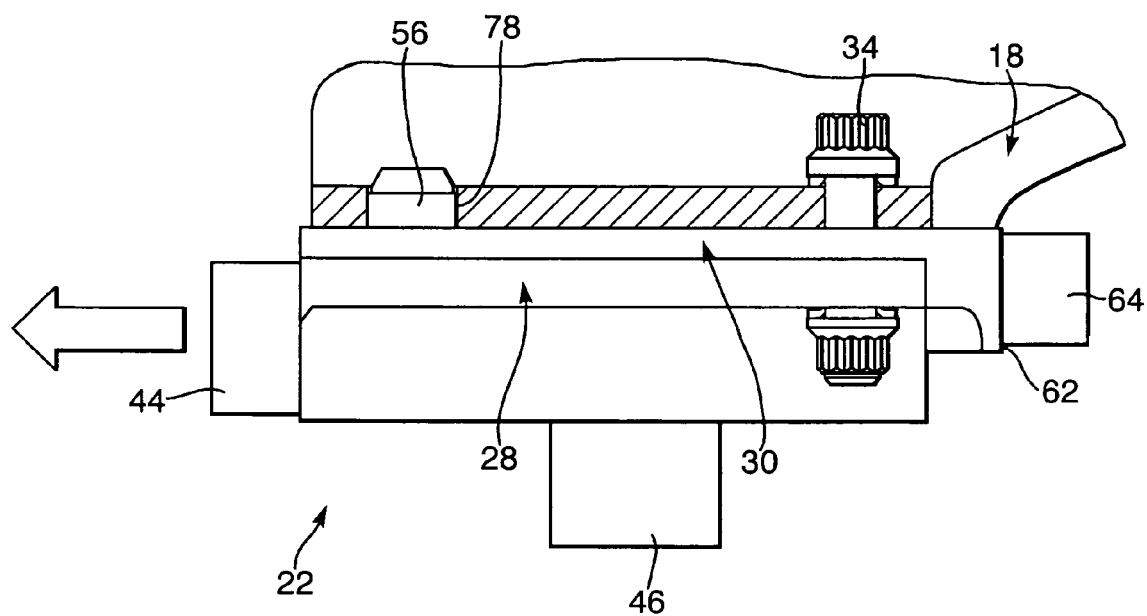
FIG. 2 is a diagrammatic part cross-sectional side view of the gas turbine engine mounting arrangement secured to a pylon of an aircraft.

Referring to FIG. 1, a ducted fan gas turbine engine 10 includes a ducted fan 12. The duct is defined by a cowl 14 and the fan 12 is driven by a core engine 16. The ducted fan gas turbine engine 10 and core engine 16 are generally annular, with the engine 10 having a central engine axis 17 about which parts of the engine 10 rotate.

A support structure in the form of a pylon 18 is affixed to aircraft wing 20, and a gas turbine engine mounting arrangement 22 according to the invention is provided to attach a forward end of the gas turbine engine 10, for example the compressor casing 24 of the core engine 16, to the pylon 18.

It should be understood that the terms forward and rearward used throughout this description are used in relation to the general direction of flow of gases through the engine 10.

A rear mounting structure 26 supports and connects the core engine 16 to an intermediate portion of the pylon 18 and supports the rear of the core engine 16. The fan casing engine cowl 14 is supported from, and attached to, the core engine 16 via an annular array of vanes which extend between the engine cowl 14, fan casing and core engine 16.

In more detail, and referring in particular to FIGS. 2 to 8, the mounting arrangement 22 comprises a main mounting member 28 and an auxiliary mounting member 30, both of which include a plurality of apertures 32 for receiving fasteners 34 which serve to secure the main and auxiliary mounting members 28, 30 together and also to secure the mounting arrangement 22 to the aircraft pylon 18.

The main mounting member 28 is substantially planar and includes a channel 36 defined in a top face 38 thereof. The channel 36 extends longitudinally along part of the main mounting member 28 and acts as a locating feature for the auxiliary mounting member 30, as will be explained hereinafter.

The main mounting member 28 defines a downwardly extending longitudinal projection 40, a forward end of which defines an end face 42 of the main mounting member 28. A first primary load transmission means in the form of a first primary load transmission pin 44 extends from the end face 42 substantially perpendicular thereto. According to one embodiment of the invention, the first primary load transmission pin 44 is solid. As best seen in FIGS. 1, 2, 7 and 8, the mounting arrangement 22 is configured such that the first primary load transmission pin 44 is substantially horizontal in use.

The main mounting member 28 further comprises a second primary load transmission means in the form of a second primary load transmission pin 46. The projection 40 defines a bottom face 48 of the main mounting member 28, and the second primary load transmission pin 46 extends downwardly from the bottom face 48 substantially perpendicular thereto such that, in use, the second primary load transmission pin 46 is disposed generally vertically. This is best seen in FIGS. 1, 2, 7 and 8. The second primary load transmission pin 46 defines a central longitudinally extending passage 50 such that the second primary load transmission pin 46 is hollow. The passage 50 extends between the upper and lower ends of the second primary load transmission pin 46 and extends into the channel 36 to define an aperture 52 therein.

Figure 5:
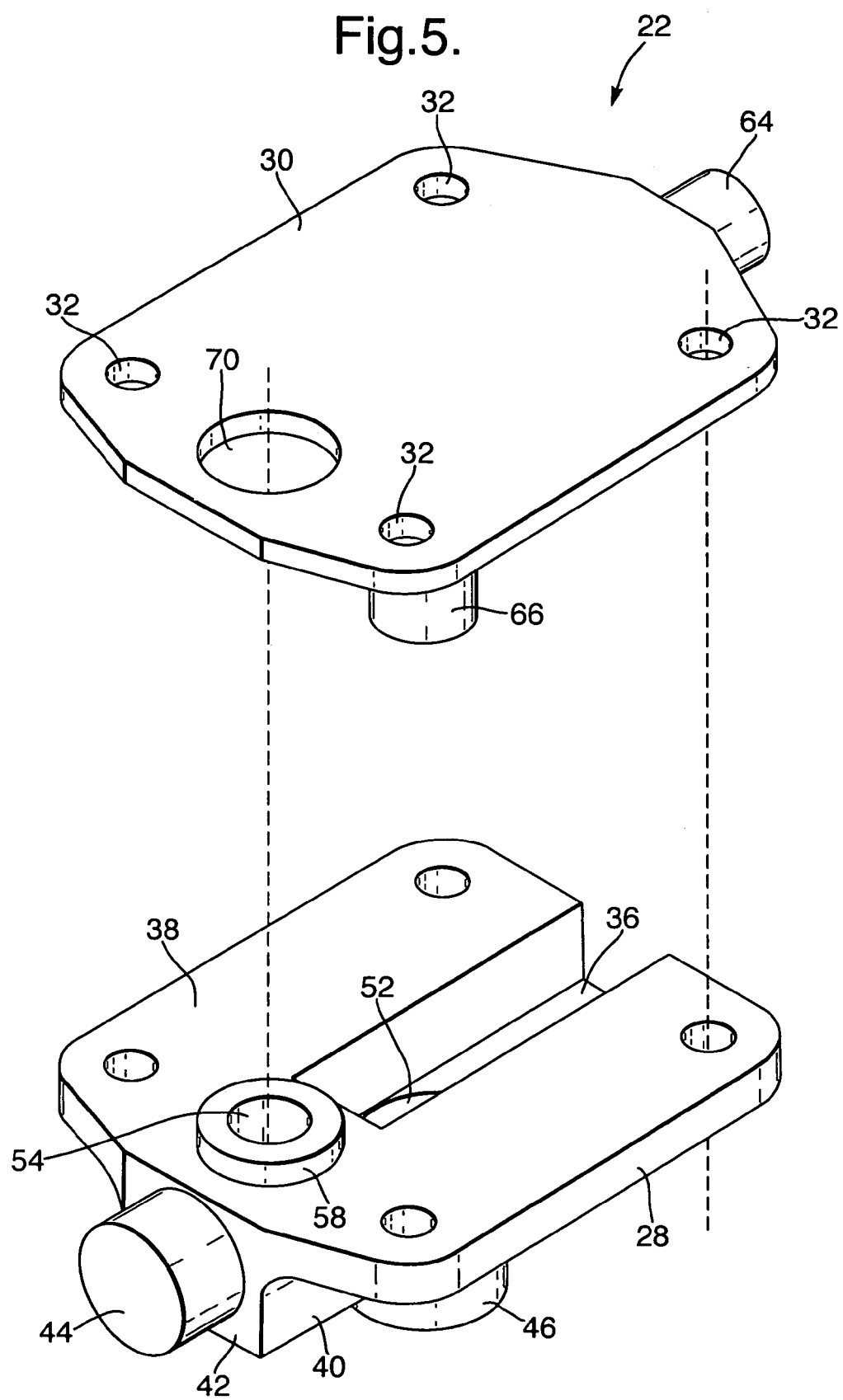
FIGS. 5 and 6 are diagrammatic perspective views of the gas turbine engine mounting arrangement in a disassembled condition.
Figure 6:
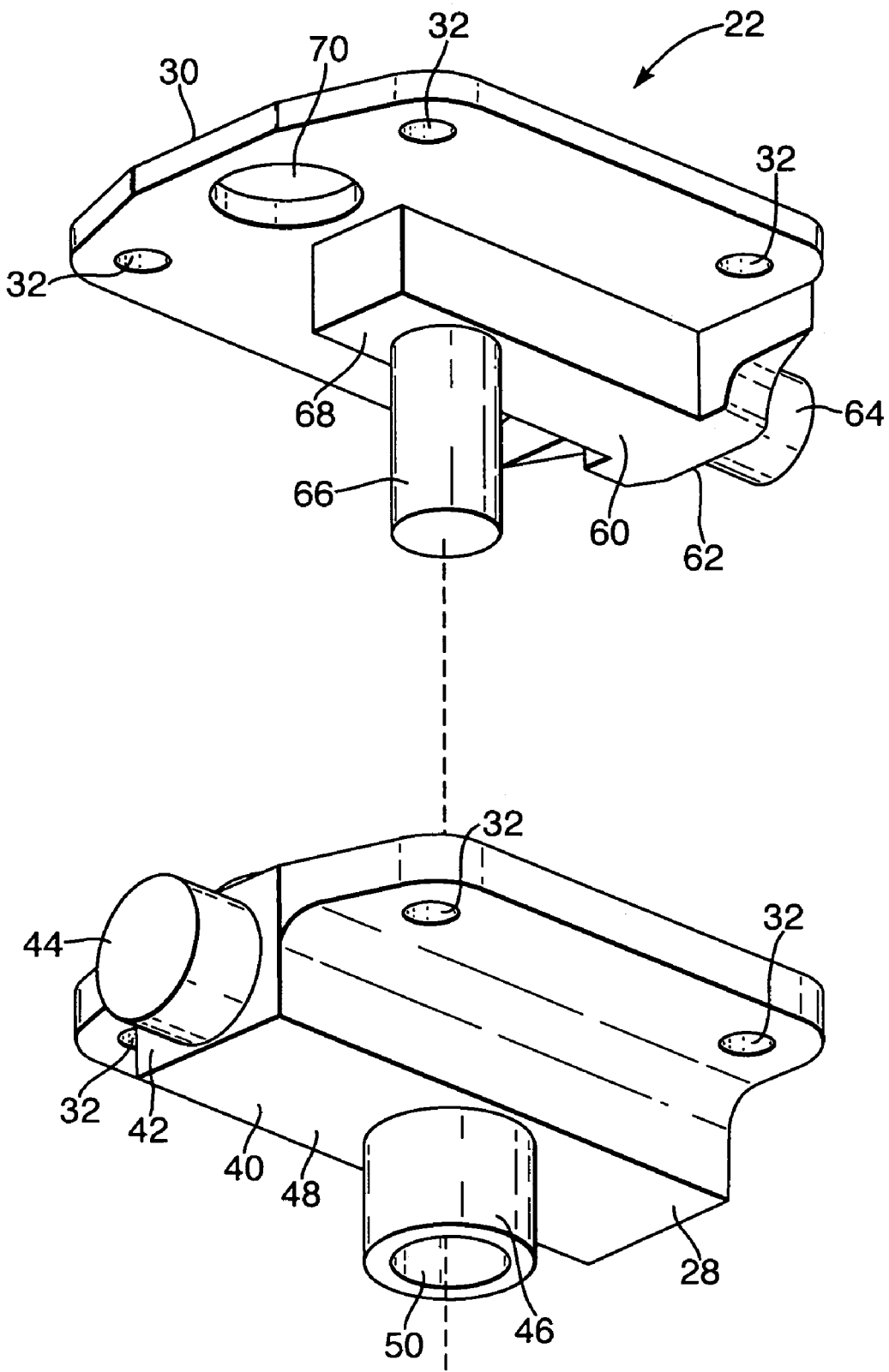

The main mounting member 28 further includes a passage 54 in which a load transmission means such as a shear pin 56 is removably mountable. In use, the shear pin 56 transmits thrust and side loads from the engine 10 to the aircraft pylon 18, as will be described in further detail hereinafter. As best seen in FIGS. 5, 7 and 8, the passage 54 defines an annular abutment 58 on the top face 38 of the main mounting member 28. The annular abutment 58 provides a further means for locating the auxiliary mounting member 30, as will be described hereinafter.

The auxiliary mounting member 30 has a similar general construction to the main mounting member 28 but is separable therefrom, as indicated above. The auxiliary mounting member 30 includes a downwardly extending projection 60 which extends longitudinally along the auxiliary mounting member 30. The projection 60 defines an end face 62 of the auxiliary mounting member 30, and a first secondary load transmission means in the form of a first secondary load transmission pin 64 extends from the end face 62 substantially perpendicular thereto so that in use the first secondary load transmission pin 64 is substantially horizontal.

A second secondary load transmission means in the form of a second secondary load transmission pin 66 extends downwardly from a bottom face 68 of the auxiliary mounting member 30, as defined by the projection 60. Both the first and second secondary load transmission pins 64, 66 are solid, in the same manner as the first primary load transmission pin 44 of the main mounting member 28.

The auxiliary mounting member 30 further includes a locating aperture 70 which is locatable around the annular abutment 58 of the main mounting member 28 when the mounting arrangement 22 is in the assembled condition.

Figure 3:
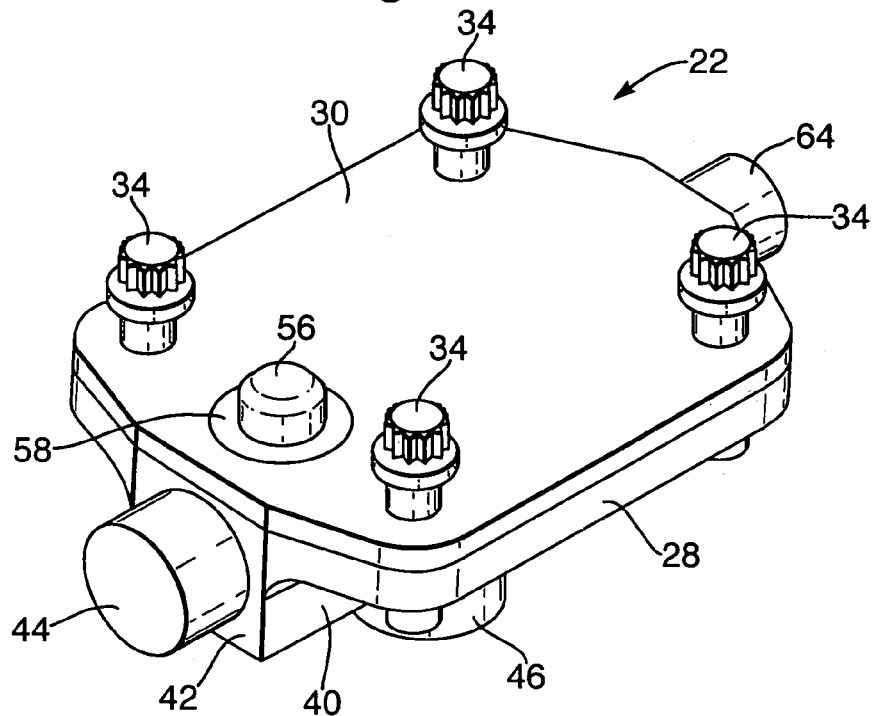
FIGS. 3 and 4 are diagrammatic perspective views of the gas turbine engine mounting arrangement in an assembled condition.
Figure 4:
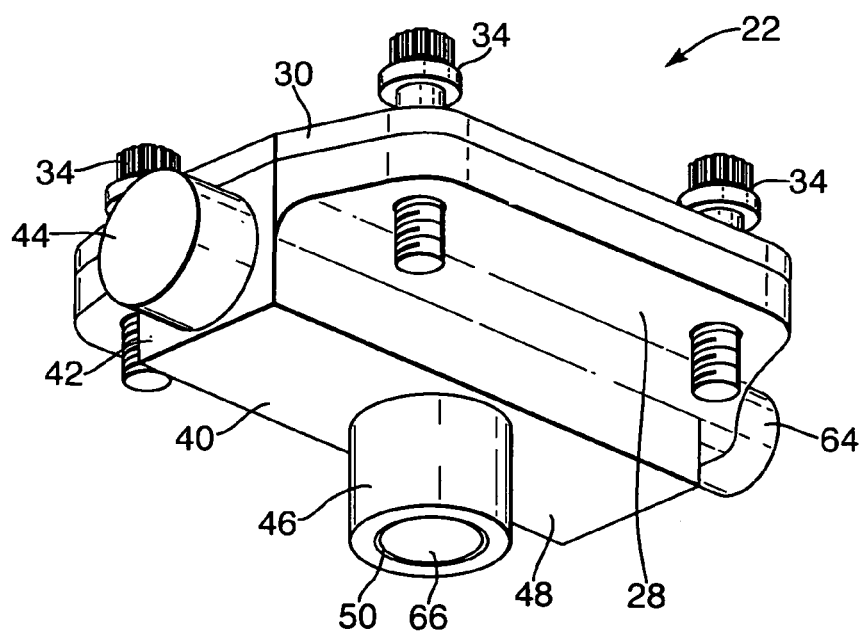
Figure 9:
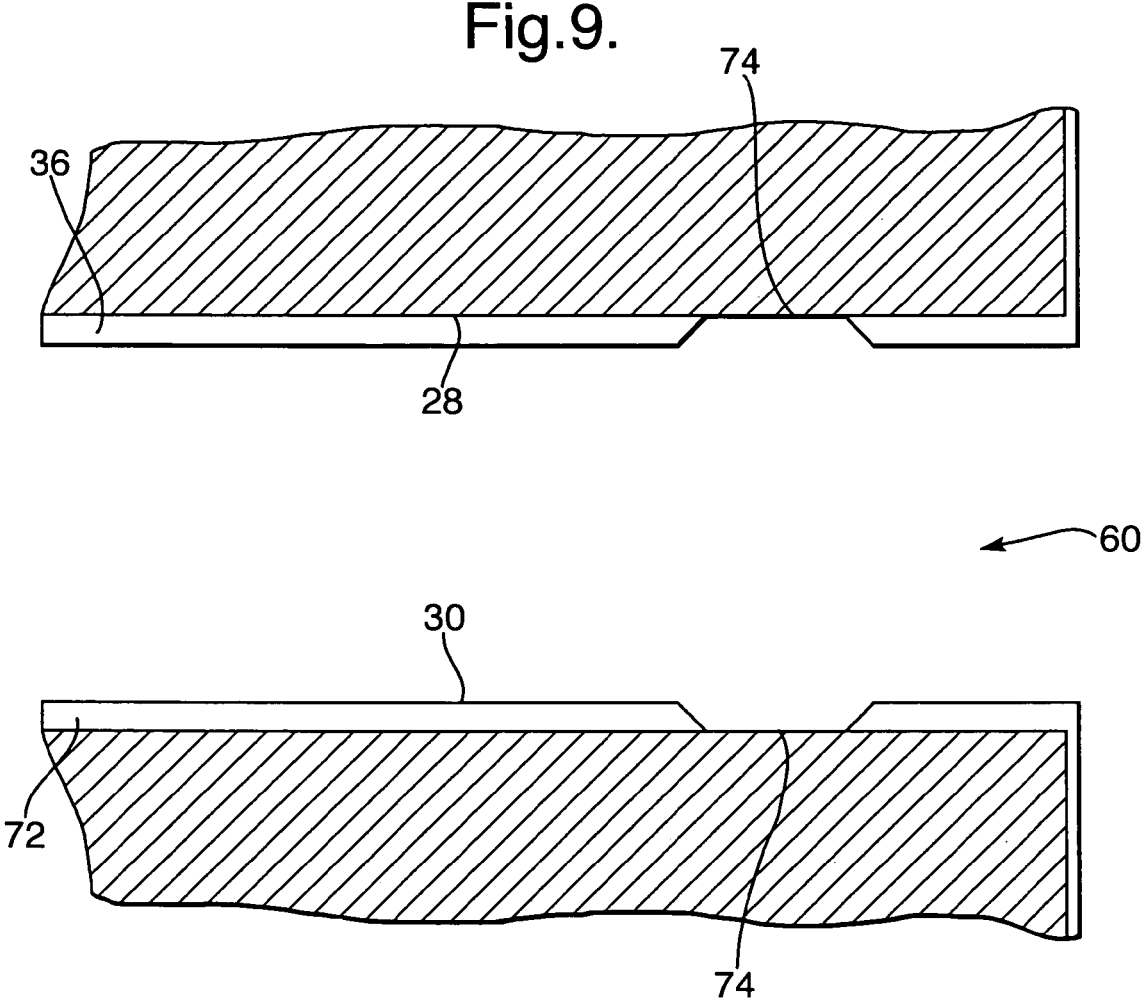
FIG. 9 is a view along line A-A of FIG. 7.

As best seen in FIGS. 3, 4 and 7, when the mounting arrangement 22 is in the assembled condition, the projection 60 extends into the channel 36 and the second secondary load transmission pin 66 extends into the passage 50 defined in the second primary load transmission pin 46. Referring to FIG. 9, in order to ensure that the projection 60 can be easily inserted into the channel 36, the projection 60 and the channel 36 are dimensioned such that a small clearance 72 is defined therebetween in use. However, in order to provide adequate alignment of the projection 60 in the channel 36 and prevent relative movement therebetween, and hence provide adequate alignment between the main and auxiliary mounting members 28, 30, the projection 60 includes locating portions 74 (see FIG. 9) on its side faces. In conjunction with the channel 36, these locating portions 74 provide a close tolerance alignment feature.

Furthermore, it will be readily seen from FIGS. 7 and 8 that the locating aperture 70 is locatable around the annular abutment 58 on the main mounting member 28 to provide for further alignment between the main and auxiliary mounting members 28, 30. The locating aperture 70 is dimensioned such that when the main and auxiliary mounting members 28, 30 are mounted together in the assembled condition, the aperture 70 is in full contact around its circumference with the annular abutment 58 to thereby provide a further close tolerance alignment feature between the main and auxiliary mounting members 28, 30. The annular abutment 58 also provides a load transmission path in the event of failure of the main mounting member 28, as will be described in further detail hereinafter.

As indicated above, the mounting arrangement 22 is securely mounted in use to a pylon 18 by way of the fasteners 34. These transmit vertical load and any pitch or roll movement, which may be induced by the thrust, side and vertical loads acting on the mounting arrangement 22, to the pylon 18. The shear pin 56 is locatable in a socket 78 (see FIG. 2) in a lower face of the aircraft pylon 18 and is operable to transmit thrust and side loads from the mounting arrangement 22 to the pylon 18.

In use, the first primary load transmission pin 44 is locatable in a corresponding socket (not shown) provided in a linkage attached to the gas turbine engine 10. The first primary load transmission pin 44 and the socket in which it is locatable are of similar dimensions to provide a very slight clearance, close-tolerance, fit such that the first primary load transmission pin 44 is securely received within the socket and is capable of transmitting vertical loads induced by the engine 10 to the pylon 18, without any substantial relative movement between the engine 10 and the mounting arrangement 22.

The second primary load transmission pin 46 is similarly locatable in a further socket provided on the gas turbine engine 10. Again, the second primary load transmission pin 46 and the further socket are of similar dimensions to provide a very slight clearance, close-tolerance, fit such that the second primary load transmission pin 46 is securely received within the further socket. Accordingly, the thrust and side (lateral) loads from the engine 10 are transmitted via the second primary load transmission pin 46, through the shear pin 56 to the pylon 18, again without any substantial relative movement between the engine 10 and the mounting arrangement 22.

The first secondary load transmission pin 64 is also locatable in a corresponding socket provided on the gas turbine engine 10. However, unlike the first primary load transmission pin 44 and corresponding socket which have close tolerance dimensions, the socket in which the first secondary load transmission pin 64 is locatable is oversized and a clearance is thus provided between the first secondary load transmission pin 64 and its corresponding socket. The importance of this will be described hereinafter.

It will also be noted, in particular from FIG. 7, that when the mounting arrangement 22 is in the assembled condition with the second secondary load transmission pin 66 located within the passage 50, a clearance 76 is defined between the second secondary load transmission pin 66 and the inner surface of the passage 50 of the second primary load transmission pin 46. Again, this is important as will now be described.

In order to comply with airworthiness regulations, one option is to provide secondary, or redundant, load paths in an engine mounting arrangement such that these secondary, or redundant, load paths can continue to transmit engine loads to the aircraft pylon 18 in the event of failure of the primary load paths.

According to the present invention, under normal engine operating conditions, the main mounting member 28 is adapted to interconnect the engine 10 with the pylon 18 and transmit engine loads directly to the pylon 18 without transmitting any substantial loads through the auxiliary mounting member 30 such that the auxiliary mounting member 30 is substantially unloaded.

Considering firstly vertical loads, as highlighted above, the first primary load transmission pin 44 is locatable in a close-tolerance socket in the gas turbine engine 10 whereas the first secondary load transmission pin 64 is located in an oversize socket such that there is a clearance between the first secondary load transmission pin 64 and the socket. As such, when there has been no failure of the first primary load transmission pin 44, vertical loads are transmitted from the engine 10 to the pylon 18 directly through the main mounting member 28. No substantial vertical loads are transmitted through the second primary load transmission pin 64, and hence through the auxiliary mounting member 30.

In the unlikely event of failure of the first primary load transmission pin 44, there would be a small amount of relative movement between the mounting arrangement 22 and the gas turbine engine 10 such that the first secondary load transmission pin 64 would take up the small clearance in the corresponding oversized socket. This would thereby ensure that the vertical engine load is transmitted through the auxiliary mounting member 30 to the pylon 18, via the first secondary load transmission pin 64.

In relation to thrust and side loads, as highlighted above, the second primary load transmission pin 46 is also locatable in a close-tolerance socket in the gas turbine engine 10 such that the thrust and side loads are transmitted from the engine 10 to the pylon 18 through the main mounting member 28. As illustrated by the dotted lines in FIG. 7, due to the fact that there is a clearance 76 between the second primary load transmission pin 46 and the second secondary load transmission pin 66, substantially none of the thrust or side loads are transmitted through the auxiliary mounting member 30 under normal engine operating conditions. These thrust and side loads are instead transmitted through the main mounting member 28, through the shear pin 56 and hence to the pylon 18.

In the unlikely event of failure of the second primary load transmission pin 46, for example as illustrated in FIG. 8, there will be some relative movement between the mounting arrangement 22 and the gas turbine engine 10 such that the clearance 76 which will exist between the socket and the second secondary load transmission pin 66 as a result of failure of the second primary load transmission pin 46 will be taken up. Accordingly, the second secondary load transmission pin 66 will now be in contact with the socket such that the thrust and side loads will be transmitted through the second secondary load transmission pin 66 and hence through the auxiliary mounting member 30. In order to transmit these thrust and side loads to the aircraft pylon 18, the loads are transmitted through the main mounting member 28 by virtue of the close tolerance abutment between the locating aperture 70 and the annular abutment 58, and then subsequently through the shear pin 56 to the aircraft pylon 18.

It will be appreciated by those skilled in the art that the mounting arrangement 22 is capable of transmitting all loads from the gas turbine engine 10 to the aircraft pylon 18 in the unlikely event of the failure of either one, or both, of the first primary load transmission pin 44 and the second primary load transmission pin 46 of the main mounting member 28.

The preferred embodiment of the mounting arrangement 22 according to the present invention is particularly advantageous since, as will be appreciated from the above description, under normal engine operating conditions, no substantial loads are transmitted through the auxiliary mounting member 30 due to the various clearance features between the main and auxiliary mounting members 28, 30. Accordingly, the auxiliary mounting member 30 will not experience loading damage, stress and fatigue under normal engine operating conditions which the main mounting member 28 will have been subjected to. The auxiliary mounting member 30 will therefore be in a substantially "as new" condition and, accordingly, the likelihood of failure of the auxiliary mounting member 30 will be reduced, thus enhancing the overall safety of the mounting arrangement 22 according to the invention.

A further advantage of the preferred embodiment of the invention is that by providing the first and second primary load transmission pins 44, 46 wholly on the main mounting member 28 and the first and second secondary load transmission pins 64, 66 wholly on the auxiliary mounting member 30, the need to provide for highly accurate alignment of the main and auxiliary mounting members 28, 30 during assembly is reduced. In existing split brackets where the split line divides the load transmission pins, accurate alignment is essential since a failure to align the bracket correctly will result in discontinuities in the contact surfaces of the load transmission pins, and hence uneven loading of the mounting arrangement and premature failure due to increased fatigue and wear.

A yet further advantage of the preferred embodiment is provided by having the passage 54 for receiving the shear pin 56 formed wholly in the main mounting member 28, and not formed by the geometry of both the main and auxiliary mounting members 28, 30, as with the prior split bracket mounting arrangement. This enables the passage 54 to be designed to provide an interference fit with the shear pin 56, thus ensuring that the shear pin 56 is securely retained and ensuring that wear is minimised.

A further advantageous effect may be achieved using the gas turbine engine mounting arrangement 22 according to the preferred embodiment of the present invention by manufacturing the main and auxiliary mounting members 28, 30 from different materials. For example, it may be desirable to manufacture the main mounting member 28, which will transmit the engine loads under normal engine operating conditions, from a material having high proof strength and fatigue properties, and to manufacture the auxiliary mounting member 30, which will be substantially unloaded under normal engine operating conditions and transmit significant engine loads only in the event of failure of the main mounting member 28, from a material having a high ultimate strength.

Although embodiments of the present invention have been described in the preceding paragraphs with reference to various examples, it should be appreciated that various modifications to the examples given may be made without departing from the scope of the present invention, as claimed. For example, further and/or alternative alignment features may be provided between the main and auxiliary mounting members 28, 30. A load transmission means other than a shear pin 56 may be provided to transmit the thrust and side loads from the mounting arrangement 22 to the pylon 18. The annular abutment 58 could be provided on the auxiliary mounting member 30 rather than the main mounting member 28, and a corresponding aperture for receiving the annular abutment defined in the main mounting member 28.

As an alternative to attaching the core engine 16 of the gas turbine engine 10 to the pylon 18, the gas turbine engine mounting arrangement 22 may be arranged to attach the fan casing of the gas turbine engine 10 to the pylon 18.

Although the gas turbine engine mounting arrangement 22 according to the invention has been described for use with a pylon 18 extending from an aircraft wing 20, it should be understood that it could be used with a pylon 18 mounted on an aircraft fuselage to mount the gas turbine engine 10 on the fuselage.

The first primary load transmission means may be in the form of a hollow first primary load transmission pin 44, rather than a solid pin 44 as described above. The use of a hollow pin would provide a reduction in the weight of the gas turbine engine mounting arrangement 22. Similarly, the first secondary load transmission pin 64 and/or the second secondary load transmission pin 66 may be hollow.

Instead of being provided on the side faces of the projection 60, locating portions 74 may alternatively or additionally be provided on the side faces of the channel 36.

I claim:

1. A gas turbine engine mounting arrangement for attaching a gas turbine engine to a support structure, the mounting arrangement comprising:
    a main mounting member interconnecting the engine with the support structure and transmit loads between the engine and the support structure under normal engine operating conditions;
    an auxiliary mounting member interconnecting the engine with the support structure and transmitting loads therebetween in the event of failure of the main mounting member, the auxiliary mounting member arranged to be substantially unloaded under normal engine operating conditions;
    characterized in that the main mounting member includes a first primary load transmission means for transmitting vertical loads between the engine and the support structure and a second primary load transmission means for transmitting thrust and lateral loads between the engine and the support structure, and in that the auxiliary mounting member includes a first secondary load transmission means for transmitting vertical loads between the engine and the support structure and a second secondary load transmission means for transmitting thrust and lateral loads between the engine and the support structure;

wherein said second primary load transmission means comprises a second primary load transmission pin and said second secondary load transmission means comprises a second secondary load transmission pin;

wherein the main mounting member and the auxiliary mounting member are mounted together, wherein the second secondary load transmission pin extends into a central longitudinally extending passage of the second primary load transmission pin; and wherein the auxiliary mounting member is interposed between the main mounting member and the support structure, in use.

2. A mounting arrangement according to claim 1, wherein the first primary load transmission means and the second primary load transmission means are provided wholly on the main mounting member.

3. A mounting arrangement according to claim 1, wherein the first secondary load transmission means and the second secondary load transmission means are provided wholly on the auxiliary mounting member.

4. A mounting arrangement according to claim 1, wherein the main mounting member includes an end face and the first primary load transmission means extends from the end face.

5. A mounting arrangement according to claim 4, wherein the end face is disposed generally vertically in use, and the first primary load transmission means extends from the end face, substantially perpendicular thereto so that it is substantially horizontal in use.

6. A mounting arrangement according to claim 1, wherein the first primary load transmission means comprises a first primary load transmission pin engageable in a corresponding socket in a linkage attached to a gas turbine engine.

7. A mounting arrangement according to claim 1, wherein the main mounting member includes a bottom face, and the second primary load transmission means extends from the bottom face.

8. A mounting arrangement according to claim 7, wherein the bottom face is disposed generally horizontally in use, and the second primary load transmission means extends from the bottom face, substantially perpendicular thereto so that it is substantially vertical in use.

9. A mounting arrangement according claim 1, wherein the second primary load transmission pin is engageable in a corresponding socket in a gas turbine engine.

10. A mounting arrangement according to claim 9, wherein the second primary load transmission pin defines the central longitudinally extending passage.

11. A mounting arrangement according to claim 10, wherein the main mounting member includes a top face and the passage extends into, and through, the main mounting member to define an aperture in the top face.

12. A mounting arrangement according to claim 1, wherein the auxiliary mounting member includes an end face and the first secondary load transmission means extends from the end face.

13. A mounting arrangement according to claim 12, wherein the first secondary load transmission means extends from the end face substantially perpendicular thereto so that it is substantially horizontal in use.

14. A mounting arrangement according to claim 1, wherein the first secondary load transmission means comprises a first secondary load transmission pin engageable in a clearance socket in a gas turbine engine.

15. A mounting arrangement according to claim 1, wherein the auxiliary mounting member includes a bottom face, and the second secondary load transmission means extends from the bottom face.

16. A mounting arrangement according to claim 15, wherein the bottom face is disposed generally horizontally in use, and the second secondary load transmission means extends from the bottom face substantially perpendicular thereto so that it is substantially vertical in use.

17. A mounting arrangement according to claim 1, wherein the main mounting member defines a passage for receiving a removable load transmission means, the passage extending between top and bottom faces of the main mounting member and defining an annular abutment on the top face.

18. A mounting arrangement according to claim 17, wherein the auxiliary mounting member defines an aperture locatable around the annular abutment when the main and auxiliary mounting members are mounted together.

19. A mounting arrangement according to claim 1, wherein the main mounting member or the auxiliary mounting member include locating projections for aligning the main and auxiliary mounting members relative to each other.

20. A mounting arrangement according to claim 1, wherein the mounting arrangement is adapted to attach the gas turbine engine to an aircraft via a pylon.

21. A mounting arrangement according to claim 20, wherein the mounting arrangement is adapted to attach a generally forward portion of the gas turbine engine to a pylon.

22. A mounting arrangement according to claim 1, wherein the mounting arrangement is adapted to connect and attach to a core engine of the gas turbine engine wherein the gas turbine engine is a ducted fan gas turbine engine.

23. A mounting arrangement according to claim 1, wherein the mounting arrangement is adapted to connect and attach to a fan casing of the gas turbine engine.

24. A mounting arrangement according to claim 1, wherein the main mounting member comprises a material having first material properties, and the auxiliary mounting member comprises a material having second, different, material properties.

25. A gas turbine engine comprising a mounting arrangement according to claim 1 for attaching the gas turbine engine to a support structure.

* * * * *